United States Patent
Kishiyama et al.

(10) Patent No.: US 8,331,341 B2
(45) Date of Patent: Dec. 11, 2012

(54) BASE STATION FOR TRANSMITTING A SYNCHRONIZATION SIGNAL

(75) Inventors: Yoshihisa Kishiyama, Yokosuka (JP); Motohiro Tanno, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 716 days.

(21) Appl. No.: 12/377,339

(22) PCT Filed: Aug. 13, 2007

(86) PCT No.: PCT/JP2007/065826
§ 371 (c)(1),
(2), (4) Date: Mar. 5, 2009

(87) PCT Pub. No.: WO2008/023599
PCT Pub. Date: Feb. 28, 2008

(65) Prior Publication Data
US 2009/0245229 A1 Oct. 1, 2009

(51) Int. Cl.
*H04J 1/00* (2006.01)
(52) U.S. Cl. .............. 370/343; 370/310; 455/452.1
(58) Field of Classification Search .............. 370/310, 370/350, 343; 455/450, 452.1
See application file for complete search history.

(56) References Cited

U.S. PATENT DOCUMENTS

| | | | |
|---|---|---|---|
| 2006/0227908 A1* | 10/2006 | Scharf et al. | 375/346 |
| 2007/0183391 A1* | 8/2007 | Akita et al. | 370/350 |
| 2008/0187068 A1 | 8/2008 | Hashimoto et al. | |

FOREIGN PATENT DOCUMENTS

| | | |
|---|---|---|
| CN | 1547818 A | 11/2004 |
| EP | 1496632 A1 | 1/2005 |
| EP | 1 855 403 A1 | 11/2007 |
| JP | 2001-144722 A | 5/2001 |
| JP | 2003-309533 | * 10/2003 |
| JP | 2003-309533 A | 10/2003 |
| WO | 2005/109709 A1 | 11/2005 |
| WO | 2006/092852 A1 | 9/2006 |

OTHER PUBLICATIONS

"SCH Structure and Cell Search Method in E-UTRA Downlink", NTT DoCoMo, NEC, Sharp; 3GPP TSG-RAN WG1 LTE Ad Hoc Meeting; R1-060042; Helsinki, Finland; Jan. 23-25, 2006; pp. 1-9 (9pages).*

Intellon, "ODDM COmmunications Primer", Mar. 1999, http://www.iet.unipi.it/f.giannetti/documenti/powerlines/PowerLineCom/Bibliografia/Rif48.pdf.*

International Search Report w/translation from PCT/JP2007/065826 dated Oct. 16, 2007 (4 pages).

(Continued)

*Primary Examiner* — Hassan Kizou
*Assistant Examiner* — Siming Liu
(74) *Attorney, Agent, or Firm* — Osha • Liang LLP

(57) ABSTRACT

A base station for transmitting a synchronization signal on a synchronization channel with a system bandwidth which is less than the maximum system bandwidth in a radio communication system supporting multiple system bandwidths includes a multiplexing unit configured to multiplex the synchronization channel and a channel other than the synchronization channel based on a characteristic of a reception filter used in a mobile station. The multiplexing unit may place the synchronization channel and the channel other than the synchronization channel on continuous subcarriers. Alternatively, the multiplexing unit may assign a guard band or a cyclic prefix to a transition band of the reception filter.

1 Claim, 7 Drawing Sheets

OTHER PUBLICATIONS

Written Opinion from PCT/JP2007/065826 dated Oct. 16, 2007 (4 pages).
"SCH Structure and Cell Search Method in E-UTRA Downlink"; NTT DoCoMo, NEC, Sharp; 3GPP TSG-RAN WG1 LTE Ad Hoc Meeting; R1-060042; Helsinki, Finland; Jan. 23-25, 2006; pp. 1-9 (9 pages).
Patent Abstracts of Japan; Publication No. 2003-309533 dated Oct. 31, 2003; Matsushita Electric Industrial Co., Ltd. (1 page).
Patent Abstracts of Japan; Publication No. 2001-144722 dated May 25, 2001; Matsushita Electric Industrial Co., Ltd. (1 page).
Keiji Tachikawa, "W-CDMA Mobile Communication System," Maruzen K.K., pp. 112, Mar. 15, 2002, 3 pages.
Chinese Office Action for Application No. 200780030543.6, mailed on Aug. 8, 2011 (8 pages).
esp@cenet Patent Abstract for Chinese Patent No. 1547818, publication date Nov. 17, 2004. (1 page).

* cited by examiner

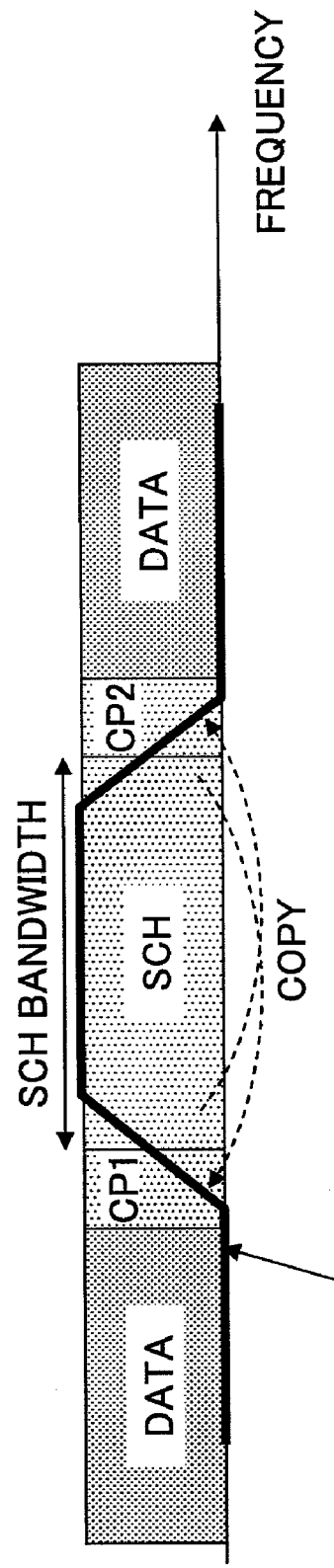

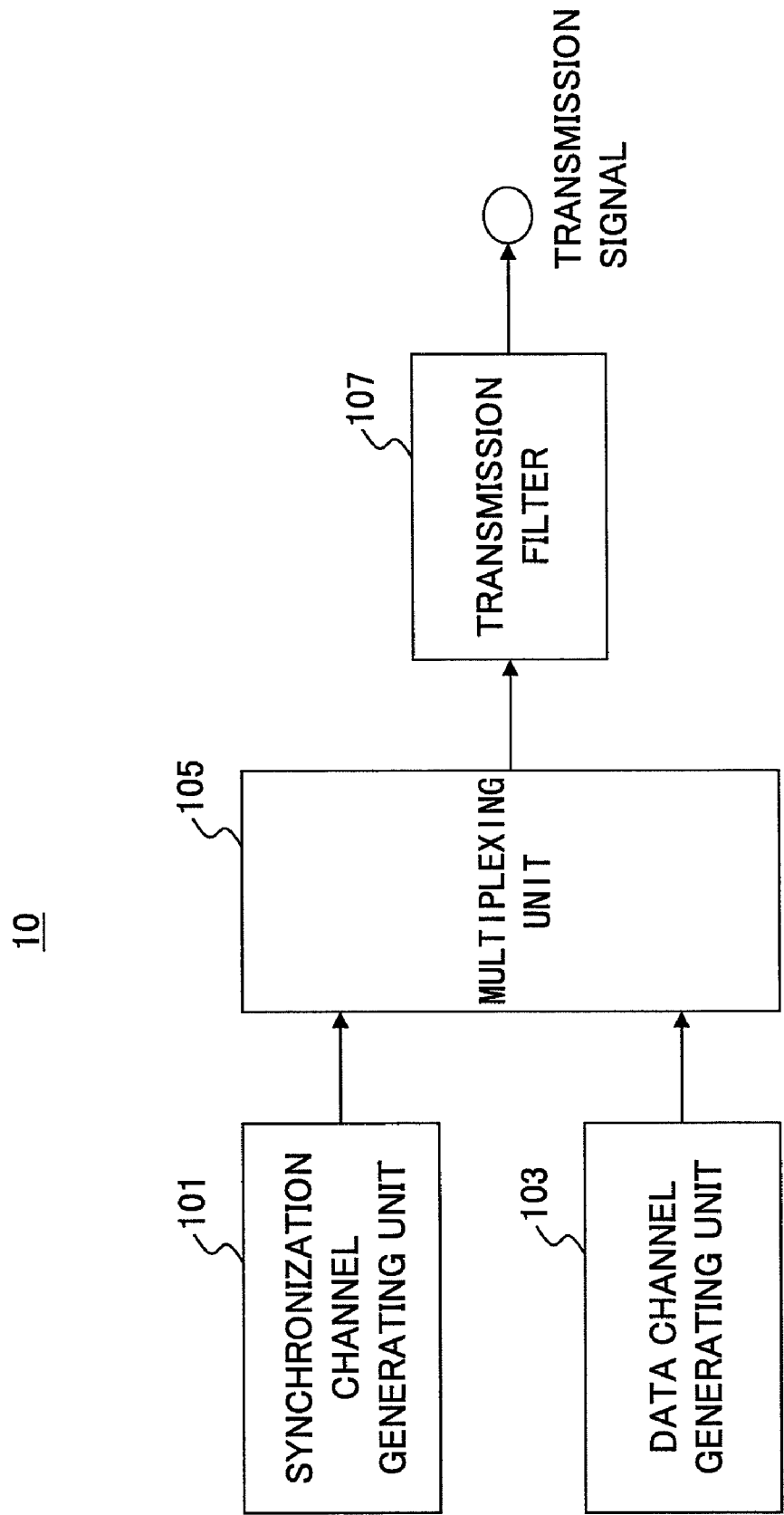

BASE STATION FOR TRANSMITTING A SYNCHRONIZATION SIGNAL

TECHNICAL FIELD

The present invention relates to a base station for generating a synchronization channel to transmit to a mobile station.

BACKGROUND ART

In W-CDMA (Wideband Code Division Multiple Access), a mobile station performs cell search by means of a downlink physical channel referred to as a SCH (Synchronization Channel). The SCH includes two subchannels: a P-SCH (Primary SCH) and an S-SCH (Secondary SCH) (see "W-CDMA MOBILE COMMUNICATIONS SYSTEM" edited by Keiji Tachikawa, Japan, Mar. 15, 2002, page 112).

The P-SCH is used by the mobile station to detect slot timing. The S-SCH is used by the mobile station to detect frame timing and a scrambling code group (spreading code group). The mobile station achieves fast cell search by means of these two SCHs.

The P-SCH signal and the S-SCH signal are code-multiplexed in the time domain for transmission. The mobile station despreads the P-SCH signal and the S-SCH signal and separates them. Since the P-SCH signal and the S-SCH signal are code-multiplexed and transmitted at the same timing, they experience the same channel fluctuations. Accordingly, the mobile station can perform synchronous detection of the S-SCH signal using the detected P-SCH signal as a reference signal (pilot signal) upon correlation detection of the S-SCH signal. In this manner, the S-SCH signal is detected with high accuracy.

DISCLOSURE OF INVENTION

Problem(s) to be Solved by the Invention

In the future mobile access schemes, it is expected that OFDM (Orthogonal Frequency Division Multiplexing) modulation will be used, which has higher tolerance for multi-path conditions.

In the radio communication system using one of such mobile access schemes, a wide system band (for example, 20 MHz) and a narrower system band (for example, 5 MHz) are used depending on the frequency band assigned to an operator, the structure of a base station, and an application. Using these bandwidths, various operators can provide their services.

For example, as shown in FIG. 1, a spectrum in an OFDM radio communication system supporting multiple system bandwidths can be used for OFDM transmission within a system bandwidth (5 MHz) which is less than the maximum system bandwidth (for example, 20 MHz).

When base stations with different system bandwidths are mixed, the base station transmits a synchronization signal on a synchronization channel using the minimum system bandwidth (for example, 1.25 MHz). With the minimum system bandwidth, a mobile station can receive the synchronization signal without predetermined information about the system bandwidth of the base station to which the mobile station attempts to connect. In other words, the mobile station can always receive the synchronization signal on the synchronization channel with the minimum system bandwidth.

When the synchronization signal is transmitted with the minimum system bandwidth, there is unused transmission bandwidth for a base station with a wider system band. When the unused transmission bandwidth is used for a channel other than the synchronization channel, it is necessary to reduce interference with the synchronization channel in each mobile station.

It is a general object of the present invention to provide a base station which can improve reception quality of a synchronization channel in a mobile station.

Means for Solving the Problem(s)

In one aspect of the present invention, there is provided a base station for transmitting a synchronization signal on a synchronization channel with a system bandwidth which is less than the maximum system bandwidth in a radio communication system supporting multiple system bandwidths, including:

a multiplexing unit configured to multiplex the synchronization channel and a channel other than the synchronization channel based on a characteristic of a reception filter used in a mobile station.

Advantageous Effect of the Invention

According to an embodiment of the present invention, reception quality of a synchronization channel in a mobile station can be improved.

BRIEF DESCRIPTION OF THE DRAWINGS

FIG. 6 shows a diagram in which a synchronization channel and other channels are multiplexed in accordance with a fourth embodiment of the present invention.

FIG. 7 shows a structure of a base station in accordance with an embodiment of the present invention.

DETAILED DESCRIPTION OF THE PREFERRED EMBODIMENTS

Description of Notations

10 base station
101 synchronization channel generating unit
103 data channel generating unit
105 multiplexing unit
107 transmission filter

BEST MODE OF CARRYING OUT THE INVENTION

Figure 1:
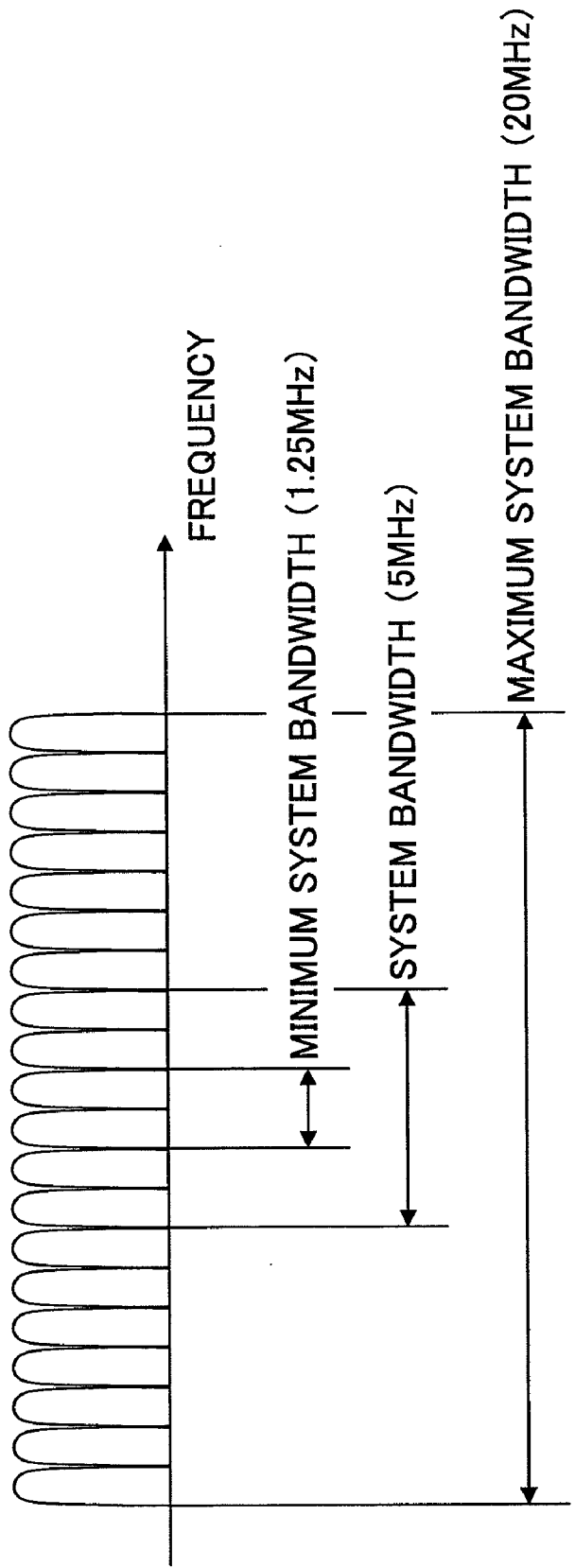
FIG. 1 shows a spectrum in an OFDM radio communication system supporting multiple system bandwidths.
Figure 2:
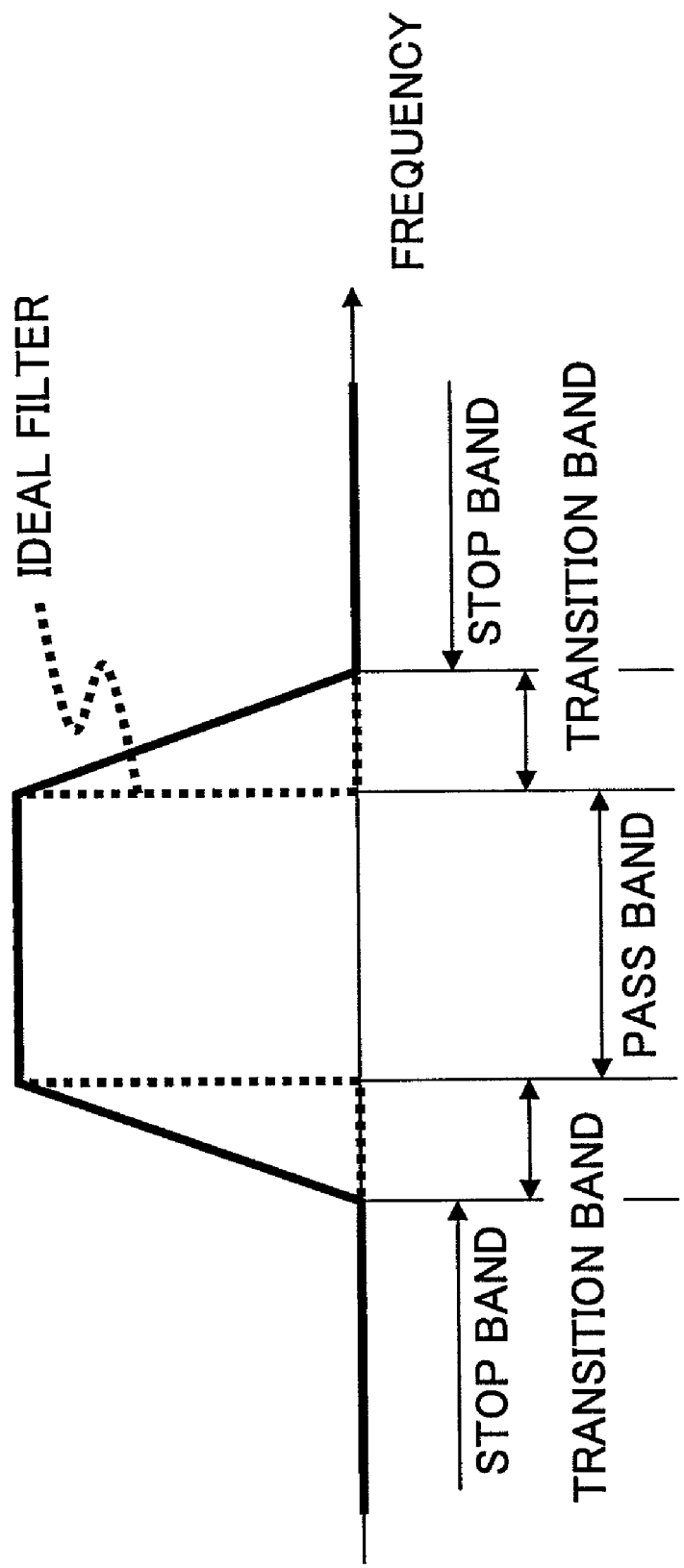
FIG. 2 shows a characteristic of a filter.

With reference to the accompanying drawings, a description is given below with regard to preferred embodiments of the present invention. With reference to FIG. 2, the following terms regarding a characteristic of a filter used in the embodiments are defined.

A "pass band" refers to a frequency band within which signals pass through the filter. A "stop band" refers to a frequency band within which signals are rejected by the filter. A "transition band" refers to a frequency band between the pass band and the stop band. It is ideal to use a filter without the transition band, which is referred to as an ideal filter.

First Embodiment

Figure 3:
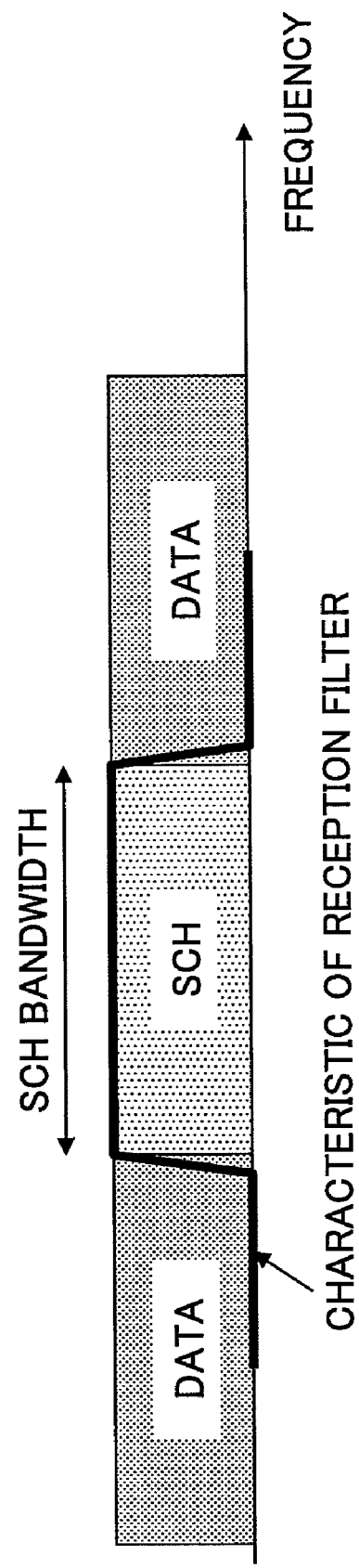
FIG. 3 shows a diagram in which a synchronization channel and other channels are multiplexed in accordance with a first embodiment of the present invention.

With reference to FIG. 3, an approach for multiplexing a synchronization channel and data channels is described below, in the case where transition bands of a reception filter in a mobile station can be substantially negligible (the reception filter is close to an ideal filter).

In the case where transition bands of the reception filter in the mobile station can be substantially negligible, the base station places the synchronization channel and the data channels on continuous subcarriers. Multiplexing the synchronization channel and the data channels in this manner allows for efficient use of frequency resources. On the contrary, the cost of the mobile station may increase because of the need for a filter with narrower transition bands in order to eliminate interference with the data channels.

Second Embodiment

Figure 4:
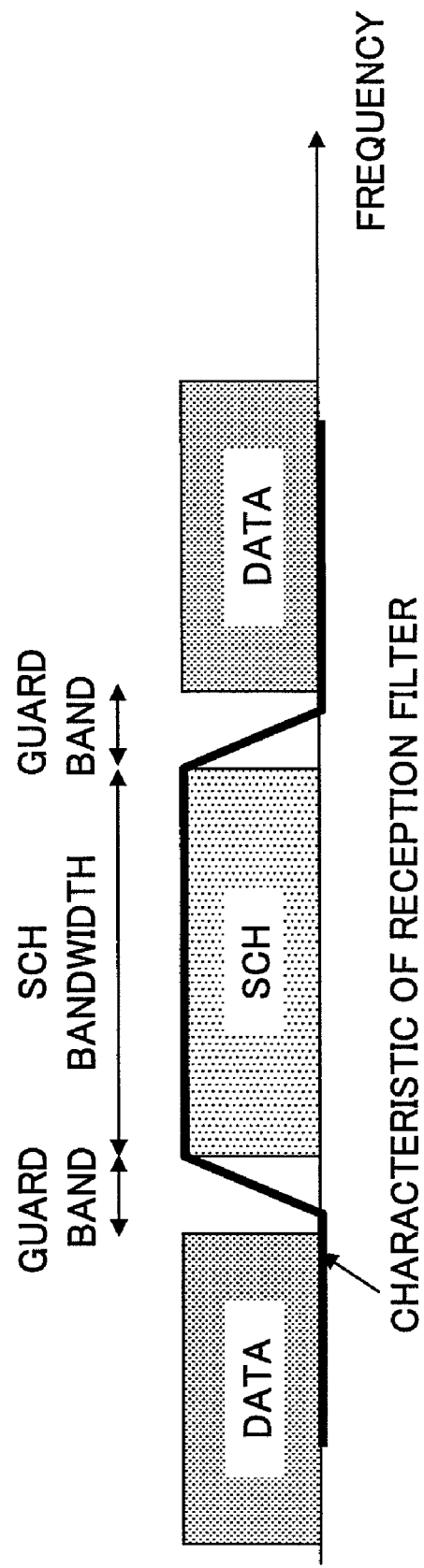
FIG. 4 shows a diagram in which a synchronization channel and other channels are multiplexed in accordance with a second embodiment of the present invention.

With reference to FIG. 4, an approach for assigning guard bands to transition bands of a reception filter in a mobile station and multiplexing a synchronization channel and data channels is described below.

In the first embodiment, interference between the data channels and the synchronization channel is likely to occur. In the second embodiment, guard bands are assigned to transition bands of the reception filter in the mobile station. Specifically, subcarriers corresponding to the transition bands are not used.

Assigning guard bands to multiplex the synchronization channel and the data channels allows the mobile station to use a filter with wider transition bands (a filter with gradual or gentle cut-off or a filter with a smaller tap number).

Third Embodiment

Figure 5:
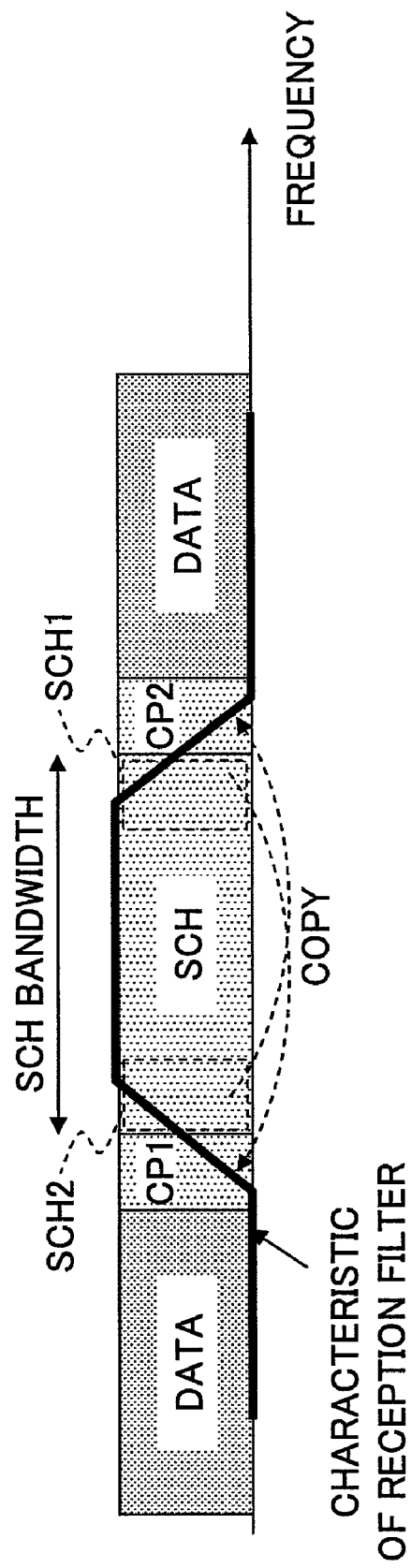
FIG. 5 shows a diagram in which a synchronization channel and other channels are multiplexed in accordance with a third embodiment of the present invention.

With reference to FIG. 5, an approach for assigning cyclic prefixes to transition bands of a reception filter in a mobile station and multiplexing a synchronization channel and data channels is described below.

As described above, in the first embodiment, interference between the data channels and the synchronization channel is likely to occur. In the third embodiment, cyclic prefixes are assigned to transition bands of the reception filter in the mobile station. Specifically, a cyclic prefix CP1 in a lower frequency component is generated using a copy of a signal SCH1 in a higher frequency component within the synchronization channel bandwidth. Similarly, a cyclic prefix CP2 in a higher frequency component is generated using a copy of a signal SCH2 in a lower frequency component within the synchronization channel bandwidth.

Assigning cyclic prefixes in this manner allows the mobile station to combine the cyclic prefix CP1 in the lower frequency component and the signal SCH1 in the higher frequency component within the synchronization channel bandwidth after filtering to reproduce the original signal SCH1. Similarly, it allows the mobile station to combine the cyclic prefix CP2 in the higher frequency component and the signal SCH2 in the lower frequency component within the synchronization channel bandwidth after filtering to reproduce the original signal SCH2. Accordingly, downsampling in the mobile station is easily achieved.

Fourth Embodiment

With reference to FIG. 6, an approach for combining characteristics of a transmission filter in a base station and a reception filter in a mobile station and multiplexing a synchronization channel and data channels according to the third embodiment is described below.

As an example for combining characteristics of the transmission filter and the reception filter, both the base station and the mobile station use Root-Nyquist filters with the same characteristic. When the characteristic of the transmission filter is multiplied with that of the reception filter, the characteristic of the reception filter in the third embodiment can be derived. Accordingly, the base station can assign cyclic prefixes as described above and multiplex the synchronization channel and the data channels.

Although the approach for combining characteristics of the transmission filter and the reception filter and multiplexing the synchronization channel and the data channels according to the third embodiment is described in the fourth embodiment, another approach is possible for combining characteristics of the transmission filter and the reception filter and multiplexing the synchronization channel and the data channels according to the first or second embodiment.

Structure of Base Station

FIG. 7 shows a base station 10 for implementing the aforementioned embodiments. The base station 10 includes a synchronization channel generating unit 101, a data channel generating unit 103, a multiplexing unit 105, and a transmission filter 107. The transmission filter 107 need not be included in the base station 10 to implement the first through third embodiments.

The synchronization channel generating unit 101 generates timing information or the like which has to be detected by all the mobile stations. The data channel generating unit 103 generates data to be transmitted to the mobile station.

The multiplexing unit 105 multiplexes a synchronization channel and a data channel. The multiplexing unit 105 places the synchronization channel on subcarriers corresponding to the minimum system bandwidths, such that the mobile stations can receive the synchronization signal on the synchronization channel without predetermined information about the system bandwidth of the base station. The multiplexing unit 105 further places the data channel on subcarriers other than the subcarriers used for the synchronization channel. Upon placing the data channel, the multiplexing unit 105 may assign a guard band or a cyclic prefix.

When the synchronization channel is filtered in consideration of the combined characteristics of the transmission filter 107 and the reception filter, the characteristic of the transmission filter 107 is adapted to that of the reception filter.

Although the base station multiplexes the synchronization channel and the data channels in the above embodiments, the base station may multiplex the synchronization channel and any channel other than the synchronization channel. For example, the base station may multiplex the synchronization channel and a control channel.

This international patent application is based on Japanese Priority Application No. 2006-225921 filed on Aug. 22, 2006, the entire contents of which are incorporated herein by reference.

The invention claimed is:

1. A base station for transmitting a synchronization signal on a synchronization channel with a system bandwidth which is less than the maximum system bandwidth in a radio communication system supporting multiple system bandwidths, comprising:
- a multiplexing unit configured to multiplex the synchronization channel and a channel other than the synchronization channel based on a characteristic of a reception filter used in a mobile station; and
- a transmission filter; wherein the multiplexing unit assigns a cyclic prefix to a transition band of a filter whose characteristic is derived by multiplying a characteristic of the transmission filter and the characteristic of the reception filter and multiplexes the synchronization channel and the channel other than the synchronization channel.

* * * * *